G. H. PERKINS,
Assignor to himself, J. Le Comte, and Atlantic Refining Company.
Machine for Uniting Tinned Plates by Heat and Pressure.
No. 9,406. Reissued Oct. 12, 1880.
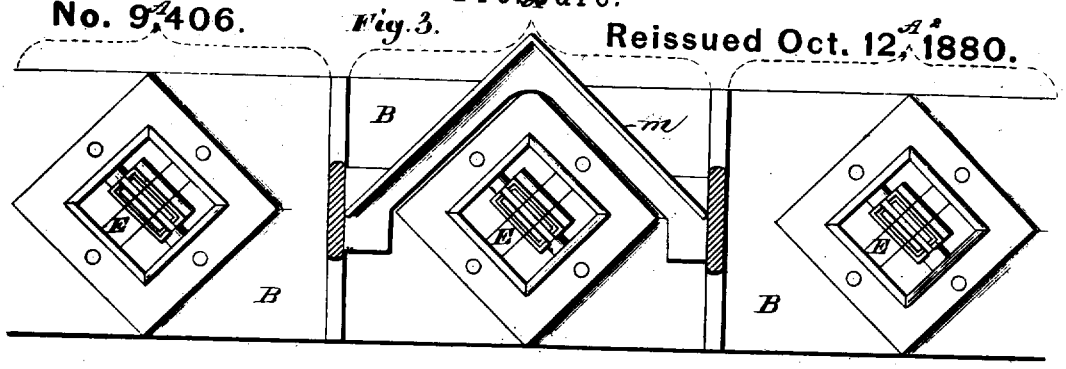
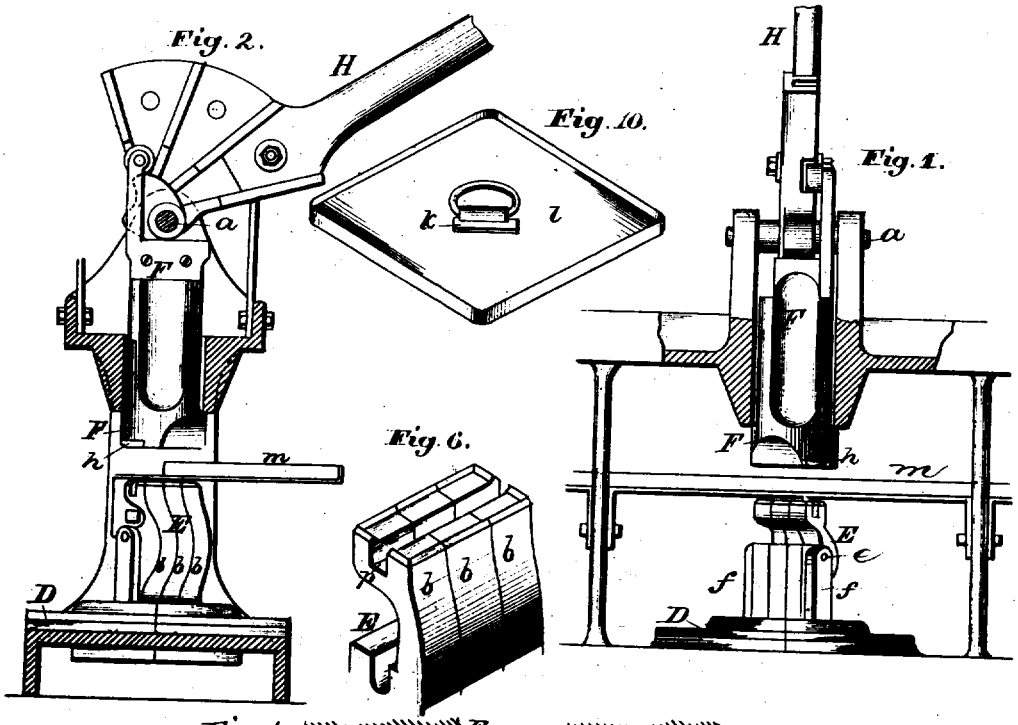
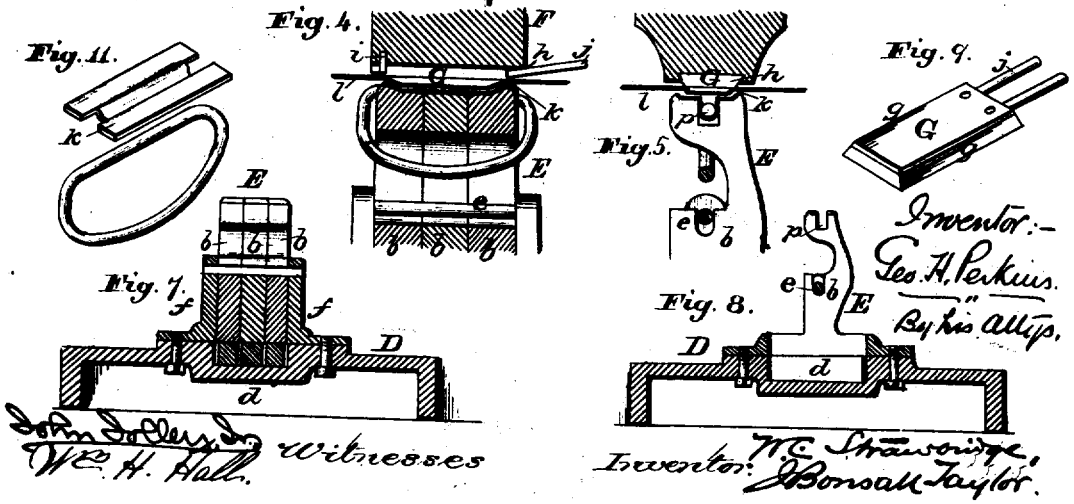
Inventor:- Geo. H. Perkins. By his Attys.
John Dollery, Wm. H. Hall. Witnesses
Inventor: M. C. Strawbridge, J. Bonsall Taylor.
N. PETERS, PHOTO-LITHOGRAPHER, WASHINGTON, D. C.

UNITED STATES PATENT OFFICE.

GEORGE H. PERKINS, OF PHILADELPHIA, PENNSYLVANIA, ASSIGNOR TO HIMSELF, JOSEPH LE COMTE, AND ATLANTIC REFINING COMPANY.

MACHINE FOR UNITING TINNED PLATES BY HEAT AND PRESSURE.

SPECIFICATION forming part of Reissued Letters Patent No. 9,406, dated October 12, 1880.

Original No. 150,887, dated May 12, 1874. Application for reissue filed July 8, 1880.

*To all whom it may concern:*

Be it known that I, GEORGE H. PERKINS, of the city of Philadelphia, Pennsylvania, have invented an Apparatus for Uniting Tinned or Amalgam Plates by Heat and Pressure, of which the following is a specification.

The object of my invention is to carry out the heat and pressure process of uniting tinned or amalgam plates for which Letters Patent No. 85,742 were granted to Joseph Le Comte on the 12th day of January, 1869, by the mechanism which I will now proceed to describe, reference being had to the accompanying drawings, in which—

Figure 1 is a front elevation, partly in section, of a soldering-press with my improvements; Fig. 2, a transverse sectional elevation of the same; Fig. 3, a sectional plan, showing the arrangement of several presses upon a single frame; Figs. 4 and 5, enlarged sectional views of the dies; Fig. 6, an enlarged perspective view of the lower die; Figs. 7 and 8, sectional views of the lower die and bed of the press; Fig. 9, an inverted perspective view of the loose or separate upper die or soldering-iron, and Figs. 10 and 11 perspective views of the lid of a tin can and of a handle and handle-plate to be soldered thereto by the action of heated dies.

In the present instance a number of presses, A A′ A², &c., are arranged in a row upon a single frame, B, as shown in Fig. 3, which reduces their cost, and enables one attendant to operate several without inconvenience. Each press has a bed-plate, D, to which the lower die, E, is secured, and a guided plunger or head, F, which carries the upper die, G, the said plunger or die-head being raised and lowered by a cam-lever, H, hung to the frame of the press at *a*, as shown in Figs. 1 and 2. The lower die, E, consists of several separate sections, *b*, arranged side by side, and resting at their bases upon rubber or other springs *d*, contained within a groove of the bed-plate, as shown in Figs. 7 and 8, by which means an exact parallelism of the upper and lower dies is obtained, as fully described in a separate application for a patent which I have made simultaneously with this. The several sections of the die are retained in their proper positions, and detached from the object to be soldered in event of adhering thereto, by a transverse rod, *e*, secured at its opposite ends to projections *f* of the bed-plate, and extending through slots in the said sections in such manner as not to interfere with their free yielding movement. (See Figs. 5 and 7.)

The upper die or soldering-tool, G, consists of a block of metal provided with a handle, *j*, for convenience in carrying it to and from the heating-furnace, and having opposite beveled edges *g g*, adapted to a dovetailed groove, *h*, in the die-head, its proper position within the latter in respect to the lower die, E, being determined by a gage or stop-pin, *i*, in the said groove. (See Figs. 4, 5, and 9.)

When a small portion only of a sheet-metal plate has to be heated, in carrying out the heat and pressure process of soldering, the said portion is apt to become so expanded or slackened as to distort the plate, and thus interfere materially with the formation of a perfect soldered joint. This I have found to be especially noticeable in soldering a small object, such as a handle-plate, *k*, to the center of the lid *l* of a tin can, (see Figs. 10 and 11;) but the objection can be entirely overcome by bulging the metal by means of the dies, so as to take up the slack simultaneously with the application of the heat and pressure of the said dies to effect the soldering. This will be readily understood by referring to Figs. 4 and 5, where it will be seen that the heated upper die has a projecting face adapted to the correspondingly sunken or recessed face of the lower die, E, so that the tin plates must be bulged by the dies sufficiently to take up the slack at the same time that they are pressed together to effect a union by the melting and subsequent cooling of the tin or amalgam on the adjoining surfaces of the said plates.

In carrying out this feature of my invention one die may have several projections and recesses adapted to corresponding projections and recesses on the opposite die, or both dies may be simply waved or corrugated. In the present instance the lower die, E, is adapted for the reception and retention of the handle-plate and handle shown in Fig. 11, which are of somewhat peculiar construction, and may form the subject of a separate application for a patent, and the lid *l*, (shown in Fig. 10,) to which the said handle and handle-plate are to be soldered, is held in an inverted position upon a triangular gage-plate, *m*, (shown in Figs. 1, 2, and 3,) when submitted to the action of the dies.

The projecting central portion of the handle-plate and the part of the handle contained therein which are not to be soldered or pressed are received within a depression, *p*, formed for their reception in the lower die, and the latter is also cut away or recessed at one side, so that the bail or handle may hang freely from the handle-plate during the soldering operation. (See Figs. 4, 5, and 6.)

I claim as my invention—

1. In an apparatus for effecting the union of separate forms of metal by heat and pressure, a fixed die, E, adapted to receive and sustain the forms to be united, a loose or separate die or soldering-iron corresponding to the fixed die first mentioned, and means whereby the loose die is brought into conjunction with the fixed die and removed out of such conjunction.

2. A machine for soldering by heat and pressure, in which the dies are formed, respectively, with a bulging and a correspondingly sunken face, so as to bulge the portion of the sheet metal subjected to them, and thereby take up its slack simultaneously with the soldering of the same.

3. The combination, substantially as described, of the soldering-iron or die G, having beveled edges *g*, with the die-head F, its dovetailed groove *h*, and stop *i*.

4. The die E, consisting of two or more separate sections, *b*, resting upon rubber or other yielding and elastic material, and retained in position by a rod, *e*, secured to the bed-plate and extending through slots in the said sections, all substantially as specified.

5. The sectional die E, recessed at the top and side, substantially as described, for the reception and retention of the handle-plate and handle during the operation of soldering the same to the lid of a can.

In testimony whereof I have hereunto signed my name this 1st day of May, A. D. 1880.

GEORGE H. PERKINS.

In presence of—

C. B. TAYLOR,

J. BONSALL TAYLOR.